(12) United States Patent
Ootsuki

(10) Patent No.: US 6,930,252 B2
(45) Date of Patent: Aug. 16, 2005

(54) METHOD AND APPARATUS FOR WATERPROOFING A WIRE HARNESS

(75) Inventor: Hiroyuki Ootsuki, Yokkaichi (JP)

(73) Assignee: Sumitomo Wiring Systems, Inc., Yokkaichi (JP)

(*) Notice: Subject to any disclaimer, the term of this patent is extended or adjusted under 35 U.S.C. 154(b) by 0 days.

(21) Appl. No.: 10/900,173

(22) Filed: Jul. 28, 2004

(65) Prior Publication Data

US 2005/0023025 A1 Feb. 3, 2005

(30) Foreign Application Priority Data

Jul. 29, 2003 (JP) ........................................ 2003-203068

(51) Int. Cl.⁷ ........................... H01R 43/00; B05D 5/00
(52) U.S. Cl. ........................ 174/72 A; 29/748; 29/854; 29/857; 29/858; 174/65 G; 174/120 R; 174/152 G; 427/118
(58) Field of Search ........................ 174/65 G, 65 SS, 174/72 A, 120 AR, 120 C, 120 R, 120 SR, 152 G, 153 G; 29/748, 749, 755, 854, 855, 857, 858, 859, 863, 868; 427/117, 118, 487, 522

(56) References Cited

U.S. PATENT DOCUMENTS

| | | | | |
|---|---|---|---|---|
| 4,721,832 A | * | 1/1988 | Toy | 174/87 |
| 4,797,513 A | * | 1/1989 | Ono et al. | 174/153 G |
| 4,963,698 A | * | 10/1990 | Chang et al. | 29/868 |
| 5,270,487 A | * | 12/1993 | Sawamura | 174/152 G |
| 5,316,789 A | * | 5/1994 | Ookuma et al. | 427/117 |
| 5,335,408 A | * | 8/1994 | Cobb | 29/447 |
| 5,641,942 A | * | 6/1997 | Iriyama et al. | 174/72 A |
| 6,225,562 B1 | * | 5/2001 | Fujishita et al. | 174/152 G |
| 6,438,828 B1 | * | 8/2002 | Uchiyama | 29/868 |
| 6,521,065 B1 | * | 2/2003 | Chujo et al. | 29/868 |
| 6,624,361 B2 | * | 9/2003 | Suzuki | 174/152 G |
| 6,648,971 B2 | | 11/2003 | Ishiguro | |
| 6,696,646 B2 | * | 2/2004 | Otsuki et al. | 174/65 G |
| 6,866,718 B2 | * | 3/2005 | Chujo et al. | 118/323 |
| 2002/0062975 A1 | | 5/2002 | Matsunaga | |
| 2002/0185297 A1 | | 12/2002 | Otsuki et al. | |
| 2002/0195267 A1 | | 12/2002 | Suzuki | |
| 2003/0006523 A1 | | 1/2003 | Suzuki | |

FOREIGN PATENT DOCUMENTS

| | | |
|---|---|---|
| EP | 1211142 | 6/2002 |
| JP | 10-135657 | 5/1998 |
| JP | 11-238416 | 8/1999 |
| JP | 2003-036752 | 2/2003 |
| JP | 2003-059359 | 2/2003 |

OTHER PUBLICATIONS

English Language Abstract of JP 11–238416.
English language Abstract of JP 10–135657.
English language Abstract of JP 2003–036752.
English language Abstract of JP 2003–059359.

* cited by examiner

Primary Examiner—Dean A. Reichard
Assistant Examiner—Adolfo Nino
(74) Attorney, Agent, or Firm—Greenblum & Bernstein, P.L.C.

(57) ABSTRACT

The invention relates to a method and apparatus for preventing water from penetrating into a wire harness, the wire harness containing a plurality of electrical wires and being adapted to fit into a grommet and to pass through a hole formed in a vehicle panel. The electrical wires respectively include a section which is to form part of a water-sealed portion. The electrical wires are arranged so that the sections forming part of the water-sealing portion are in parallel in a row. A first water-sealing agent is applied on the sections. A second water-sealing agent is applied over the first water-sealing agent, the second water-sealing agent having a viscosity higher than that of the first water-sealing agent. The parallel arrangement of sections are curled for fitting into the grommet, so as to form the water-sealed portion.

20 Claims, 7 Drawing Sheets

METHOD AND APPARATUS FOR WATERPROOFING A WIRE HARNESS

BACKGROUND OF THE INVENTION

1. Field of the Invention

The present invention relates to a method and apparatus for waterproofing a wire harness, such as one disposed in the boundary between an engine compartment and vehicle interior, where prevention of water penetration is necessary. Such waterproofing prevents water from penetrating into the gaps formed between the electrical wires of a wire harness. Such a wire harness is adapted to be fit into a grommet and passed through a hole formed in a panel of the vehicle.

2. Description of the Related Art

When a wire harness for a vehicle passes from the engine compartment to the passenger compartment, it is held in a grommet fitted around a hole in a vehicle panel separating the engine compartment from the passenger compartment. Such a configuration can prevent water seepage from the engine compartment into the passenger compartment.

The grommet conventionally has a tubular portion which extends to a funnel-shaped portion having an enlarged circular end section. The external face of the enlarged end section is provided with a circular groove that can engage with the peripheral rim of a hole formed in a vehicle panel. In this manner, the grommet and the panel hole provide an efficient seal against water seepage. In addition, the section of the wire harness that passes through the tubular portion is preferably gripped therein. Moreover, when a grommet is used in a water-filled area, the tubular portion is usually treated with a water-sealing agent.

For instance, JP-A-HEI 10-135657 discloses a process for treating electrical wires forming part of a wire harness, in which the wires are grouped in parallel, and the portion subject to water-protection treatment is covered with a water-sealing agent that has a viscosity of 1,000 to 2,000 poises. The electrical wires are then assembled to form a substantially round cross-section and passed through a grommet.

However, when the water-sealing agent has such a high level of viscosity, it must be pushed through forcibly between the electrical wires in order to form the waterproof portion properly. As a consequence, the process normally lowers work efficiency.

To improve the operation process, the viscosity of water-sealing agent may be lowered to less than 1,000 poises. However, such an agent creates a new problem, in that the agent tends to sag from the electrical wires.

Further, the wire harness protected in such a manner must be handled or controlled frequently, so as to check whether there is still no water infiltration. Such an operation further lowers the productivity.

SUMMARY OF THE INVENTION

The present invention has been made in view of the above-described problems. Accordingly, it is an object of the present invention to provide a method and an apparatus for waterproofing a wire harness by using a plurality of water-sealing agents having different viscosities.

According to the present invention, a method for waterproofing a wire harness is provided that includes providing a wire harness including a plurality of electrical wires, arranging the electrical wires so that respective portions of the electrical wires are laterally aligned in a substantially parallel manner, applying a first water-sealing agent to the respective portions of the electrical wires, applying a second water-sealing agent over the first water-sealing agent, the second water-sealing agent having a viscosity higher than a viscosity of the first water-sealing agent, and laterally curling the substantially parallel portions of the electrical wires having the first water-sealing agent and the second water sealing-agent applied thereto, so as to form a water-sealed portion of the wire harness configured to fit into a grommet and to pass through a hole formed in a vehicle panel.

In a further aspect of the present invention, the substantially parallel portions of said electrical wires are wrapped in a thin film after applying the first and second water-sealing agents. Such wrapping preferably occurs prior to the laterally curling.

In a further aspect of the present invention the second water-sealing agent is applied so as to substantially cover the first water-sealing agent. Further, the second water-sealing agent is applied along a longitudinal extent of the electrical wires which is greater than a longitudinal extent of the electrical wires along which the first water-sealing agent is applied. Further, the respective portions of the electrical wires are arranged in a substantially vertical column, and the first and second water-sealing agents are applied from the bottom of the column upwardly towards the top of the column.

The first water-sealing agent preferably has a viscosity of approximately 100 poises or less. Further still, the first water-sealing agent preferably has a viscosity of approximately 50 poises or less.

The second water-sealing agent preferably has sufficient viscosity to form a paste. The second water-sealing agent preferably has a viscosity of at least approximately 1,000 poises. Further still, the second water-sealing agent preferably has a viscosity of at least approximately 10,000 poises.

In another aspect of the present invention, a method for waterproofing an electrical cable is provided that includes providing an electrical cable including a plurality of electrically insulated wires, arranging the wires so that respective portions of the wires are laterally aligned in a substantially parallel manner, applying a first water-sealing agent to the respective portions of the wires, and applying a second water-sealing agent over the first water-sealing agent in such a manner as to substantially cover and contain the first water-sealing agent, the second water-sealing agent having a viscosity higher than a viscosity of the first water-sealing agent.

In another aspect of the present invention, a system for waterproofing a wire harness having a plurality of electrical wires is provided. The system includes a holder configured to support the electrical wires so that respective portions of the electrical wires are laterally aligned in a substantially parallel manner, a first applicator configured to apply a first water-sealing agent to the respective portions of the electrical wires supported by the holder, and a second applicator configured to apply a second water-sealing agent over the first water-sealing agent, the second water-sealing agent having a viscosity higher than a viscosity of the first water-sealing agent. The substantially parallel portions of the electrical wires having the first water-sealing agent and the second water sealing-agent applied thereto are laterally curled so as to form a water-sealed portion of the wire harness configured to fit into a grommet and to pass through a hole formed in a vehicle panel.

In a further aspect of the present invention the first water-sealing agent has a viscosity of approximately 50 poises or less, and the second water-sealing agent has a viscosity of at least approximately 10,000 poises.

In a further aspect of the present invention the holder includes a base portion having two distal end portions, and a pair of holder portions extending upwardly from the respective distal end portions of the base portion. Each of the pairs of holder portions includes a respective slit extending downwardly from an opening in a top face of the holder portion towards the base portion, such that the electrical wires can be inserted through the openings and superposed on each other within the slits, extending parallel to the base portion and in an alignment direction of the slits. Further, the top faces of the holder portions are inclined toward the opening so as to form two slant faces.

In a further aspect of the present invention the second applicator includes two members arranged on opposite sides of the electrical wires supported by the holder. Each member includes an end portion having an elongate nozzle opening extending substantially parallel to the electrical wires. The elongate nozzle openings face toward each other, such that the second water-sealing agent can be extruded from each of the elongate nozzle openings toward the electrical wires supported by the holder.

In a further aspect of the present invention the first applicator includes a spreader for applying the first water-sealing agent.

In another aspect of the present invention, a system for waterproofing an electrical cable having a plurality of electrically insulated wires is provided. The system includes a holder configured to support the wires so that respective portions of the wires are laterally aligned in a substantially parallel manner, a first applicator configured to apply a first water-sealing agent to the respective portions of the wires, and a second applicator configured to apply a second water-sealing agent over the first water-sealing agent in such a manner as to substantially cover and contain the first water-sealing agent, the second water-sealing agent having a viscosity higher than a viscosity of the first water-sealing agent.

In the above system, a distance between the elongate nozzle openings is preferably set as a function of the diameter of an electrical wire to which the water-sealing agent is to be applied.

In the above system, the lower-viscosity water-sealing agent is first applied to the electrical wires and fills the gaps formed between the electrical wires. Subsequently, the higher-viscosity water-sealing agent is applied and covers the lower-viscosity water-sealing agent as a whole, so that the latter is prevented from sagging or flowing along the length direction of the electrical wires. In this manner, the gaps between the electrical wires are filled with the lower-viscosity water-sealing agent, and water infiltration is completely eliminated. Further, the sagging or lateral flow of the lower-viscosity water-sealing agent can be prevented by virtue of the overlaid higher-viscosity water-sealing agent.

When the viscosity of a first water-sealing agent is 100 poises or less, that water-sealing agent spreads smoothly into the space between the electrical wires, and the space is securely filled with this agent. Further, when a paste-like second water-sealing agent is subsequently applied thereupon, it prevents the first agent from sagging and maintains the latter filled between the wires.

In particular, when the second (paste-like) water-sealing agent is applied from the bottom wire towards the top wire, it pushes back the first (lower-viscosity) water-sealing agent which could eventually sag or drip down. The sagging of the first water-sealing agent can thus be avoided more efficiently.

BRIEF DESCRIPTION OF THE DRAWINGS

The above, and the other objects, features and advantages of the present invention will be made apparent from the following description of the preferred embodiments, given purely as non-limiting examples, with reference to the accompanying drawings, in which.

DETAILED DESCRIPTION OF THE PREFERRED EMBODIMENTS

A preferred embodiment of the present invention will be described below with reference to the drawings.

Figure 1:
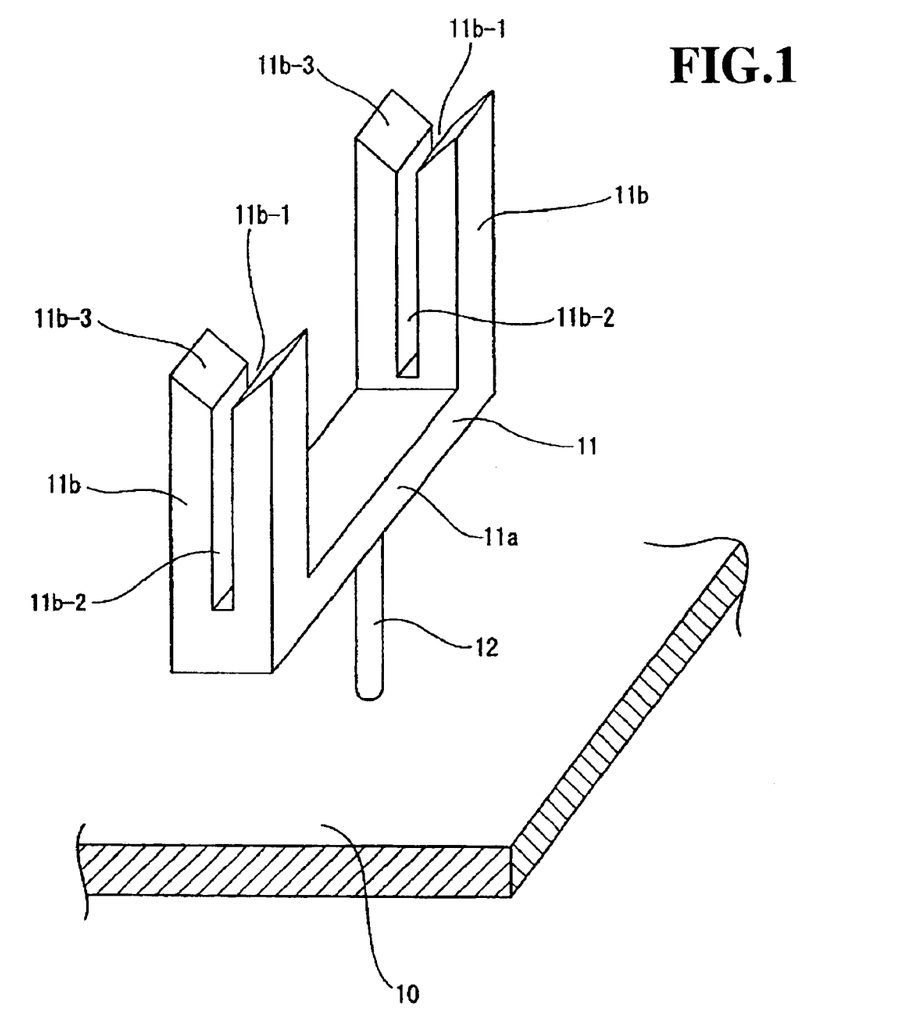
FIG. 1 is a perspective view of a device for preparing a water-sealed portion and a cable-arranging table.

FIG. 1 shows a water-sealing device 11 disposed on a cable-arranging table 10 used for assembling a wire harness W/H. The water-sealing device 11 is held by a supporting rod 12 that can be mounted on the wire-arranging table 10 in a removable manner. The water-sealing device 11 has a substantially U-shaped form that includes a base portion 11a, a first pair of cable-holder portions 11b with respective top faces, and a second pair of cable-holder portions 11b with respective top faces. The insulated electrical wires of a wire harness are arranged along the base portion 11a.

Figure 3:
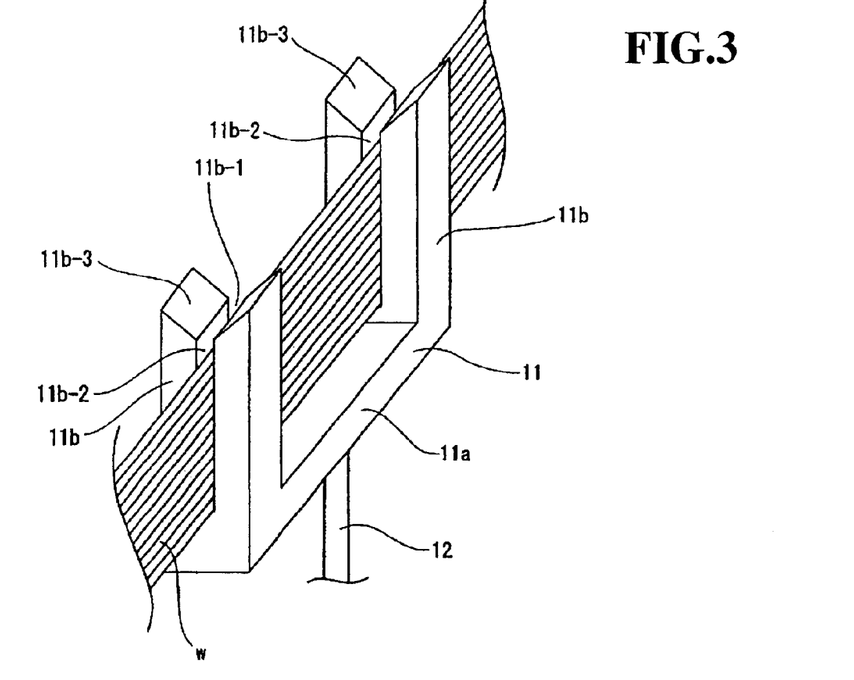
FIG. 3 is a perspective view of the device for preparing a water-sealed portion of FIG. 1, when electrical wires are aligned in a row.

The first and second pairs of cable holder portions 11b include respective slits 11b-2 with openings 11b-1 extending downwards from their corresponding top face. Each top face is inclined toward the slits 11b-2 so as to form two slanted faces 11b-3. Electrical wires w can thus be inserted through the opening 11b-1 and arranged in a row in the slits 11b-2 as shown in FIG. 3.

When a wire harness W/H is formed, its insulated electrical wires w are arranged on the cable-arranging table 10. The water-sealing device 11 is formed on that portion of electrical wires w of the wire harness W/H on which a grommet is to be fitted. The portion of the electrical wires w is inserted between the first pair of cable-holder portions 11b and between the second pair of cable-holder portions 11b. As shown in FIG. 3, the electrical wires w are thus arranged in a column within the slits 11b-2.

Figure 4:
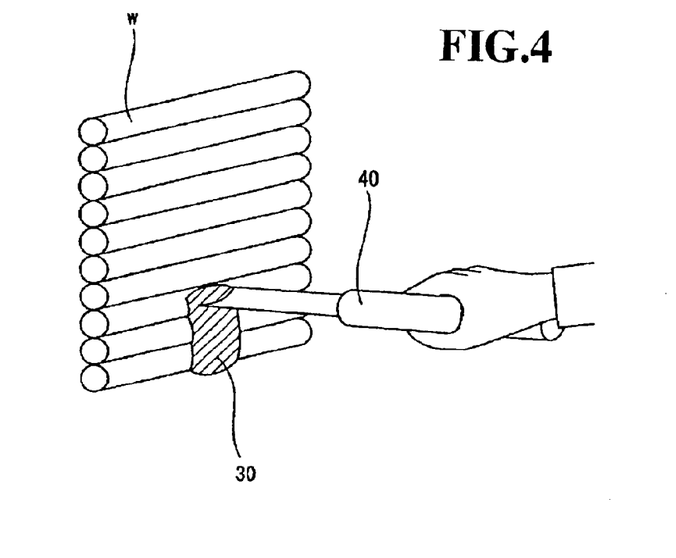
FIG. 4 shows application of a low-viscosity water-sealing agent to the electrical wires.
Figure 5A:
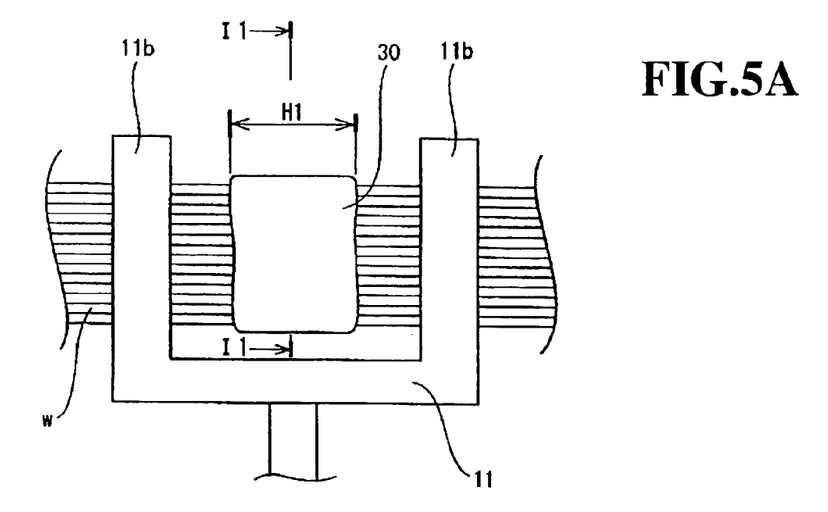
FIG. 5A is a side view of the device for preparing a water-sealed portion of FIG. 1, when the low-viscosity water-sealing agent is applied.
Figure 5B:
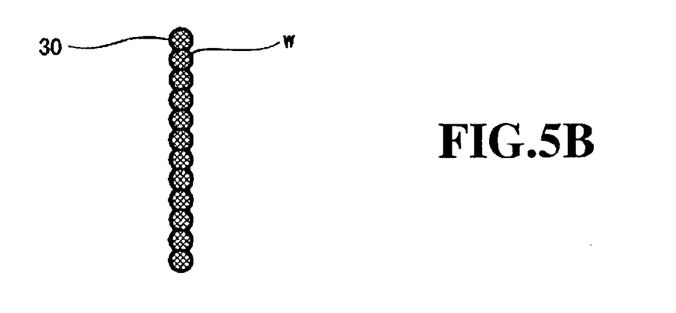
FIG. 5B is a cross-sectional view of the water-sealed portion with the low-viscosity water-sealing agent applied, taken along line I1—I1 of FIG. 5A.

As shown in FIG. 4, a low viscous (low-viscosity) water-sealing agent 30 is applied to the aligned electrical wires w. The water-sealing agent 30 may be applied in any suitable manner, such as from the bottom end upwards, using a spatula or paddle 40, in the manner illustrated in the FIG. 4. FIG. 5A shows the length H1 (measured along the electrical cables) of the portion to which the agent is applied, and FIG. 5B shows how the gaps between the electrical wires are filled. The water-sealing agent 30 may have any suitable viscosity, such as a viscosity of less than about 100 poises, or less than about 50 poises.

Figure 2:
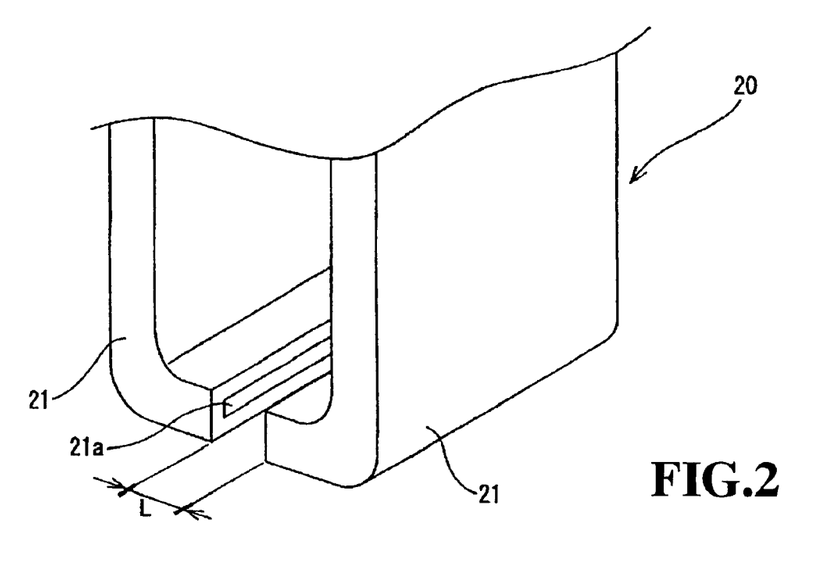
FIG. 2 is a perspective view of part of a device for applying a water-sealing agent.

FIG. 2 shows part of a device 20 for applying a highly viscous (high-viscosity) water-sealing agent 31 to electrical wires. The device 20 has two nozzles 21 at a lower portion extending in parallel along that lower portion. The end portion of each nozzle 21 is turned inwardly and has an elongate nozzle opening 21a. The highly viscous water-sealing agent 31 is thereby extruded around the wires w as they pass between the nozzle openings 21a. The distance L between the two end faces of the nozzles 21 can be adjusted as a function of the diameter of an electrical wire to which the agent is applied.

Figure 6:
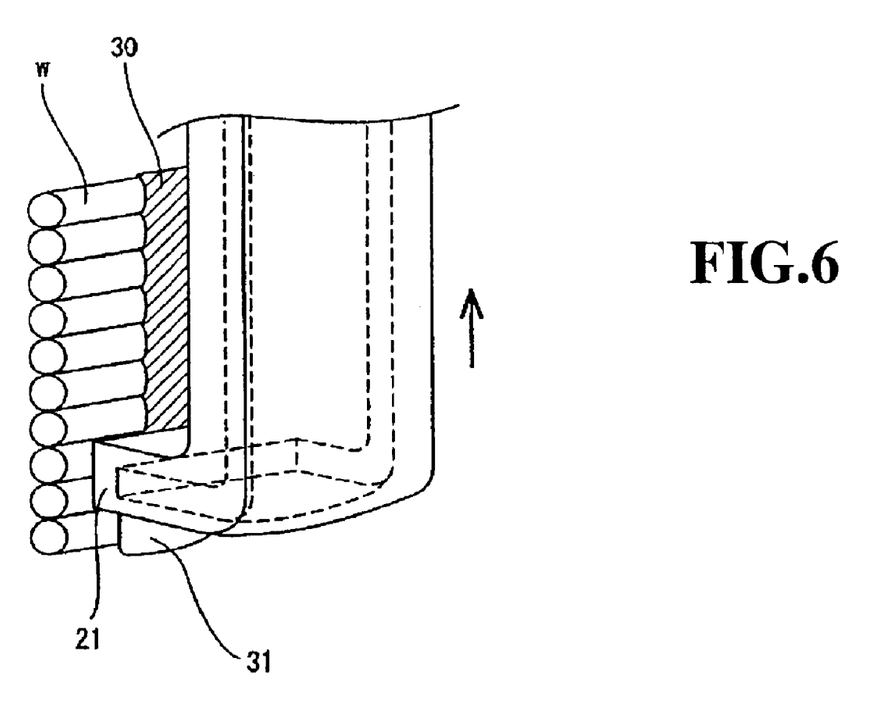
FIG. 6 shows application of a high viscosity water-sealing agent to the electrical wires.
Figure 7A:
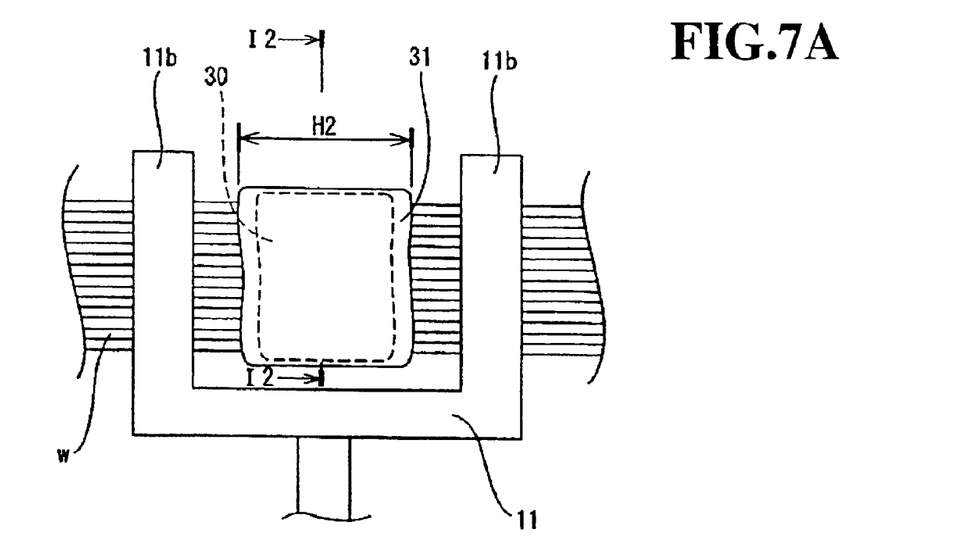
FIG. 7A is a side view of the device for preparing a water-sealed portion of FIG. 1, when the high-viscosity water-sealing agent is applied.
Figure 7B:
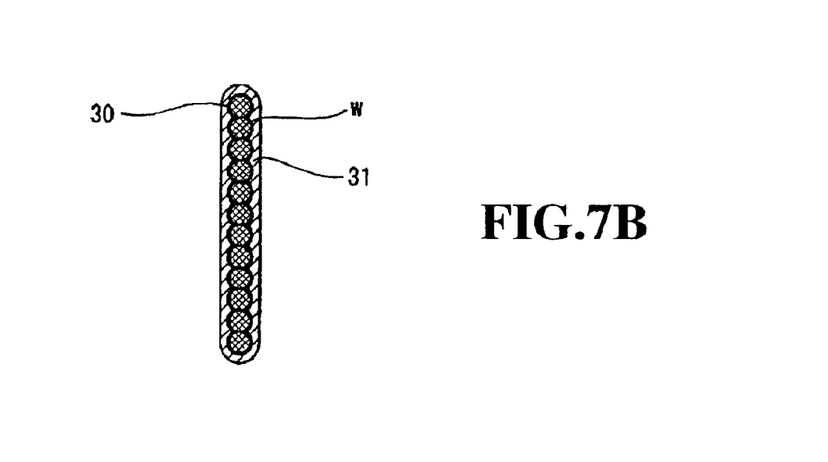
FIG. 7B is a cross-sectional view of the water-sealed portion with the high-viscosity water-sealing agent applied, taken along line I2—I2 of FIG. 7A.

After application of the low-viscosity water-sealing agent 30, the end faces of the nozzles 21 of the device 20 for applying the high-viscosity water-sealing agent 31 are placed into contact with, or adjacent to, the electrical wire w at the bottom in the slits 11b-2, as shown in FIG. 6. The highly viscous water-sealing agent 31, preferably in the form of a paste, is extruded through the openings 21a of the nozzles 21, while the nozzles are moved upwardly, so that the highly viscous water-sealing agent 31 is applied on both sides of all the electrical wires w. The highly viscous water-sealing agent 31 may have any suitable viscosity, such as a viscosity of about 1,000 poises or more, or preferably about 5,000 poises or more, or more preferably of about 10,000 poises or more. Thus, as shown in FIGS. 7A and 7B, the highly viscous agent 31 covers the low-viscosity agent 30 along a cable length of H2 (H2>H1) and from the bottommost to topmost electrical wires in the column.

Figure 8A:
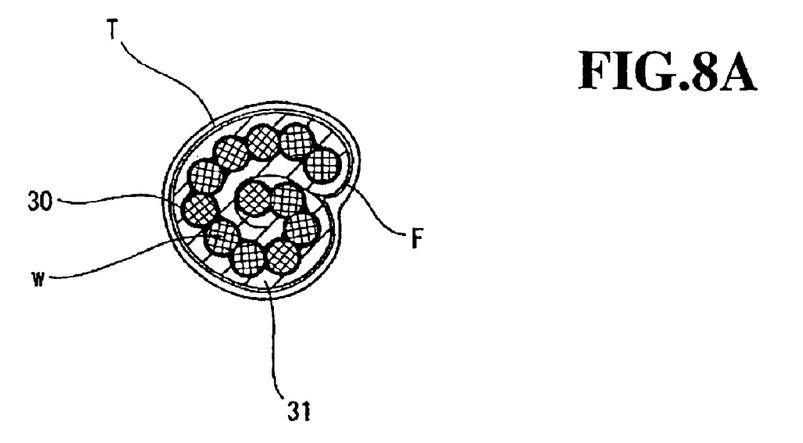
FIG. 8A is a cross-sectional view of a water-sealed portion formed by rounding up the water-sealed electrical wires.
Figure 8B:
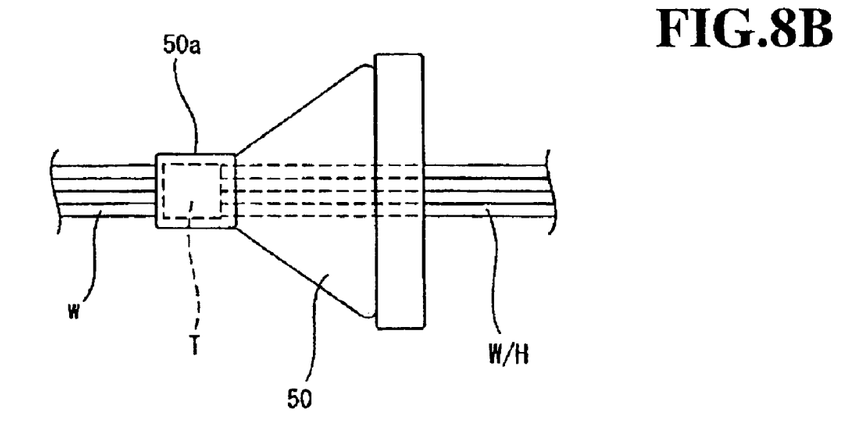
FIG. 8B is a side view of a grommet holding a wire harness having a water-sealed portion.

Finally, as shown in FIG. 8A, the electrical wires are wrapped with a thin film F made of any suitable material, such as vinyl chloride. The parallel arrangement of portions of electrical wires coated with the low-viscosity agent 30 and highly viscous agent 31 is curved around within the thin film F into a spiral (as viewed from the wire cross-sections at the portions) so as to form a water-sealed portion. The water-sealed portion may be further fixed by a tape T. As shown in FIG. 8B, the whole structure is passed through the tubular portion 50a of the grommet 50, and held hermetically therein.

In the above construction, a low-viscosity water-sealing agent 30 is first applied on vertically arranged electrical wires, and a highly viscous water-sealing agent 31 is then superposed thereto. In this manner, the low-viscosity water-sealing agent 30 serves to fill the gaps between the electrical wires w, and the highly viscous water-sealing agent 31 serves to prevent the low-viscosity water-sealing agent 30 from drooping down or oozing along the electrical wires w. Filling the wire gaps with a low-viscosity agent 30 secures a good water seal. Thus, waterproofing quality inspections are not necessary, and operation efficiencies can be greatly improved.

As shall be understood from the above, when a low-viscosity water-sealing agent and a highly viscous water-sealing agent are successively applied to the electrical wires, the former fills the gaps between the electrical wires w and the latter prevents the former from drooping down or flowing along the electrical wires w. Water migration between wires can thus be prevented completely. Consequently, conventional inspections for water sealing can be omitted and productivity is greatly improved.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present disclosure relates to subject matter contained in priority Japanese Application No. 2003-203068, filed on Jul. 29, 2003, the disclosure of which is herein expressly incorporated by reference in its entirety.

What is claimed:

1. A method for waterproofing a wire harness comprising:
providing a wire harness including a plurality of electrical wires;
arranging said electrical wires so that respective portions of said electrical wires are laterally aligned in a substantially parallel manner;
applying a first water-sealing agent to said respective portions of said electrical wires;
applying a second water-sealing agent over said first water-sealing agent, said second water-sealing agent having a viscosity higher than a viscosity of said first water-sealing agent; and
laterally curling said substantially parallel portions of said electrical wires having said first water-sealing agent and said second water sealing-agent applied thereto, so as to form a water-sealed portion of said wire harness configured to fit into a grommet and to pass through a hole formed in a vehicle panel.

2. The method according to claim 1, further including wrapping said substantially parallel portions of said electrical wires in a thin film after applying said first and second water-sealing agents.

3. The method according to claim 2, wherein said wrapping occurs prior to said laterally curling.

4. The method according to claim 1, wherein said second water-sealing agent is applied so as to substantially cover said first water-sealing agent.

5. The method according to claim 1, wherein said first water-sealing agent has a viscosity of approximately 100 poises or less.

6. The method according to claim 1, wherein said first water-sealing agent has a viscosity of approximately 50 poises or less.

7. The method according to claim 6, wherein said second water-sealing agent has a viscosity of at least approximately 10,000 poises.

8. The method according to claim 1, wherein said second water-sealing agent has sufficient viscosity to form a paste.

9. The method according to claim 1, wherein said second water-sealing agent has a viscosity of at least approximately 1,000 poises.

10. The method according to claim 1, wherein said second water-sealing agent has a viscosity of at least approximately 10,000 poises.

11. The method according to claim 1, wherein said second water-sealing agent is applied along a longitudinal extent of said electrical wires which is greater than a longitudinal extent of said electrical wires along which said first water-sealing agent is applied.

12. The method according to claim 1, wherein said respective portions of said electrical wires are arranged in a substantially vertical column, and said first and second water-sealing agents are applied from the bottom of said column upwardly towards the top of said column.

13. A method for waterproofing an electrical cable comprising:

providing an electrical cable including a plurality of electrically insulated wires;

arranging said wires so that respective portions of said wires are laterally aligned in a substantially parallel manner;

applying a first water-sealing agent to said respective portions of said wires;

applying a second water-sealing agent over said first water-sealing agent in such a manner as to substantially cover and contain said first water-sealing agent, said second water-sealing agent having a viscosity higher than a viscosity of said first water-sealing agent.

14. A system for waterproofing a wire harness including a plurality of electrical wires, said system comprising:

a holder configured to support said electrical wires so that respective portions of said electrical wires are laterally aligned in a substantially parallel manner;

a first applicator configured to apply a first water-sealing agent to said respective portions of said electrical wires supported by said holder; and a second applicator configured to apply a second water-sealing agent over said first water-sealing agent, said second water-sealing agent having a viscosity higher than a viscosity of said first water-sealing agent;

wherein said substantially parallel portions of said electrical wires having said first water-sealing agent and said second water sealing-agent applied thereto are laterally curled so as to form a water-sealed portion of said wire harness configured to fit into a grommet and to pass through a hole formed in a vehicle panel.

15. The system according to claim 14, wherein said first water-sealing agent has a viscosity of approximately 50 poises or less, and said second water-sealing agent has a viscosity of at least approximately 10,000 poises.

16. The system according to claim 14, wherein said holder comprises:

a base portion having two distal end portions; and a pair of holder portions extending upwardly from the respective distal end portions of said base portion, each of said pairs of holder portions including a respective slit extending downwardly from an opening in a top face of the holder portion towards said base portion, such that said electrical wires can be inserted through said openings and superposed on each other within said slits, extending parallel to said base portion and in an alignment direction of said slits.

17. The system according to claim 16, wherein the top faces of the holder portions are inclined toward the opening so as to form two slant faces.

18. The system according to claim 14, wherein said second applicator includes two members arranged on opposite sides of said electrical wires supported by said holder, each member including an end portion having an elongate nozzle opening extending substantially parallel to said electrical wires, wherein said elongate nozzle openings face toward each other, such that said second water-sealing agent can be extruded from each of said elongate nozzle openings toward said electrical wires supported by said holder.

19. The system according to claim 14, wherein said first applicator includes a spreader for applying said first water-sealing agent.

20. A system for waterproofing an electrical cable including a plurality of electrically insulated wires, said system comprising:

a holder configured to support said wires so that respective portions of said wires are laterally aligned in a substantially parallel manner;

a first applicator configured to apply a first water-sealing agent to said respective portions of said wires; and a second applicator configured to apply a second water-sealing agent over said first water-sealing agent in such a manner as to substantially cover and contain said first water-sealing agent, said second water-sealing agent having a viscosity higher than a viscosity of said first water-sealing agent.

* * * * *